United States Patent
Tosone et al.

(10) Patent No.: US 12,480,186 B2
(45) Date of Patent: Nov. 25, 2025

(54) SHEET OR STRIP MADE OF A HARDENABLE ALUMINUM ALLOY, A VEHICLE PART MADE THEREFROM, A USE, AND A METHOD FOR PRODUCING THE SHEET OR STRIP

(71) Applicant: AMAG Rolling GmbH, Braunau am Inn—Ranshofen (AT)

(72) Inventors: Ramona Tosone, Neukirchen an der Enknach (AT); Stefan Pogatscher, Leoben (AT); Lukas Stemper, Graz (AT); Peter J. Uggowitzer, Ottenbach (CH)

(73) Assignee: AMAG Rolling GmbH, Braunau am Inn—Ranshofen (AT)

( * ) Notice: Subject to any disclaimer, the term of this patent is extended or adjusted under 35 U.S.C. 154(b) by 812 days.

(21) Appl. No.: 17/791,147

(22) PCT Filed: Jan. 7, 2021

(86) PCT No.: PCT/EP2021/050203
§ 371 (c)(1),
(2) Date: Jul. 6, 2022

(87) PCT Pub. No.: WO2021/140163
PCT Pub. Date: Jul. 15, 2021

(65) Prior Publication Data
US 2023/0042050 A1   Feb. 9, 2023

(30) Foreign Application Priority Data

Jan. 7, 2020 (EP) .................... 20150632
Aug. 12, 2020 (EP) .................... 20190782

(51) Int. Cl.
*C22C 21/06* (2006.01)
*C21D 8/02* (2006.01)
(Continued)

(52) U.S. Cl.
CPC ............ *C22C 21/06* (2013.01); *C21D 8/0226* (2013.01); *C21D 8/0236* (2013.01);
(Continued)

(58) Field of Classification Search
None
See application file for complete search history.

(56) References Cited

U.S. PATENT DOCUMENTS 4,140,556 A   2/1979   Baba et al.
9,315,885 B2  4/2016   Lin
(Continued)

FOREIGN PATENT DOCUMENTS

CH   218419 A   12/1941
CN   107022725 A   8/2017
(Continued)

OTHER PUBLICATIONS

H. Löffler, et al. "Decomposition Processes in Al—Zn—Mg Alloys," Journal of Materials Science, 1983, pp. 2215-2240, vol. 18.

*Primary Examiner* — George Wyszomierski
*Assistant Examiner* — Janell C Morillo

(57) ABSTRACT

A sheet or strip made of a hardenable aluminum alloy, a vehicle part made therefrom, a use, and a method for producing the sheet or strip are disclosed. In order to insure a powerful paint bake response (PBR), it is proposed for the aluminum alloy to have from 4.0 to 5.5 wt % magnesium (Mg) and from 2.5 to 5.5 wt % zinc (Zn) and for it to be in the T4-FH state, wherein the wt % of magnesium (Mg) is greater than the wt % of zinc (Zn).

18 Claims, 1 Drawing Sheet

(51) Int. Cl.
  *C21D 9/46*  (2006.01)
  *C22F 1/047*  (2006.01)

(52) U.S. Cl.
  CPC ............. *C21D 8/0273* (2013.01); *C21D 9/46* (2013.01); *C22F 1/047* (2013.01)

(56) References Cited

U.S. PATENT DOCUMENTS

| 9,580,775 | B2 | 2/2017 | Lin |
| 9,850,556 | B2 | 12/2017 | Lin |
| 11,851,736 | B2 | 12/2023 | Erlwein et al. |
| 2017/0081749 | A1* | 3/2017 | Matsumoto ............. C22F 1/053 |
| 2017/0349989 | A1 | 12/2017 | Gupta et al. |
| 2018/0023174 | A1 | 1/2018 | Matsumoto et al. |

FOREIGN PATENT DOCUMENTS

| CN | 110541096 A | 12/2019 |
| DE | 112011103667 T5 | 8/2013 |
| EP | 3521466 A1 | 8/2019 |
| EP | 3690076 A1 | 8/2020 |
| GB | 1387961 A | 3/1975 |
| GB | 1552151 A | 9/1979 |
| JP | S616244 A | 1/1986 |
| JP | S61179843 A | 8/1986 |
| JP | 2011184795 A | 9/2011 |
| JP | 2012097337 A | 5/2012 |
| JP | 5342201 B2 | 11/2013 |
| JP | 2014198899 A | 10/2014 |
| JP | 2015071823 A | 4/2015 |
| JP | 2015175045 A | 10/2015 |
| JP | 2016160515 A | 9/2016 |

* cited by examiner

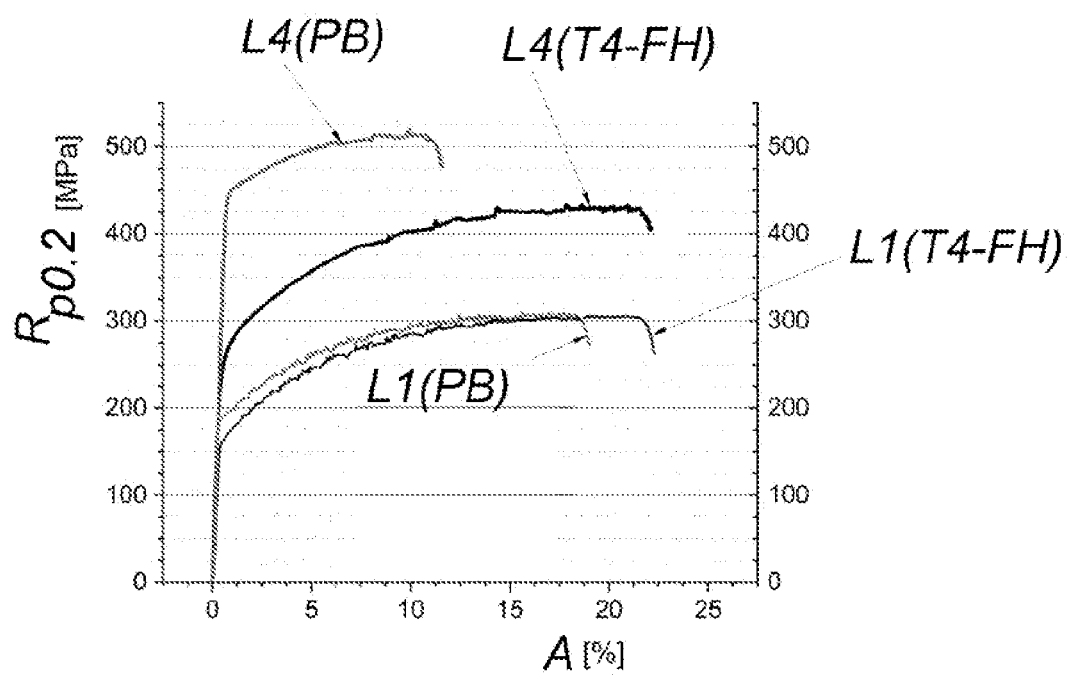

SHEET OR STRIP MADE OF A HARDENABLE ALUMINUM ALLOY, A VEHICLE PART MADE THEREFROM, A USE, AND A METHOD FOR PRODUCING THE SHEET OR STRIP

FIELD OF THE INVENTION

The invention relates to a sheet or strip composed of a hardenable aluminum alloy, a vehicle part made therefrom, its use, and a method for producing the sheet or strip.

DESCRIPTION OF THE PRIOR ART

In order to enable both a high deformability of an aluminum sheet during forming or sheet metal forming and also a comparatively high strength after a paint bake cycle (for example in a CDP process), U.S. Pat. No. 4,140,556B1 proposes for an Al—Mg aluminum alloy having 3.5 to 5.5 wt % Mg to be supplemented with 0.5 to 2 wt % Zn and possibly 0.3 to 1.2 wt % Cu and for it to be transformed into the T4 state (solution annealing, quenching with cold age hardening).

In the T4 state, the alloy disclosed in U.S. Pat. No. 4,140,556B1 disadvantageously exhibits no $R_{p0.2}$ strength gain or an extremely low $R_{p0.2}$ strength gain (e.g.: an approx. 5 MPa $R_{p0.2}$ strength gain with Al4.7Mg1.5Zn0.6Cu) achieved by means of the paint bake cycle—which ignores the heat of the paint bake cycle for achieving a strength increase and thus, for example, reduces the energy efficiency in the production of vehicle parts.

US20170349989A1 also discloses an Al—Mg aluminum alloy with 1.75 wt % Mg and 0.78 wt % Cu, which in the T4-FH state, i.e. in the T4 state with a stabilizing annealing treatment ("pre-aging"), achieves an $R_{p0.2}$ strength gain of approx. 60 MPa by means of the paint bake cycle. This paint bake response (PBR) is low in comparison to 6xxx alloys in the T4-FH state whose PBR achieves from 100 to at most 150 MPa $R_{p0.2}$ strength gain.

This fact currently rules out the use of an Al—Mg aluminum alloy for components that require a high strength in the use state—even though Al—Mg-aluminum alloys would have better formability in comparison to 6xxx alloys.

SUMMARY OF THE INVENTION

The object of the invention, therefore, is to provide an Al—Mg aluminum alloy that has a powerful artificial aging response, more particularly a powerful paint bake response (PBR). In addition, this Al—Mg aluminum alloy should be able to achieve comparatively high strengths.

The aluminum alloy, which is balanced in the alloy elements of from 4.0 to 5.5 wt % magnesium (Mg) and from 2.5 to 5.5 wt % zinc (Zn) and which is in the T4-FH state, namely the T4 state with a stabilizing annealing treatment, wherein the wt % of magnesium (Mg) is >the wt % of zinc (Zn), surprisingly exhibits a particularly powerful artificial aging response. For this purpose, this stabilizing annealing treatment can take place, for example, at 95° C. to 125° C., more particularly at 100° C. to 120° C., for at least 20 min and at most 10 h, more particularly for at least 2 h and at most 4 h.

Thus at a degree of sheet deformation of 2% with a paint bake response at 185° C. for 20 minutes, it was possible to achieve an $R_{p0.2}$ strength gain of far greater than 150 MPa—which is unknown even for PBR-optimized 6xxx alloys. This Al—Mg—Zn alloy in the T4-FH state, namely the solution-annealed, acceleration-cooled (preferably quenched), stabilization-annealing-treated, and cold age hardened Al—Mg—Zn alloy, clearly responds to a paint baking with a particularly fast hardening—for example through a preferred formation of stable T-phase precursors ($Mg_{32}(Al,Zn)_{49}$ or $Mg_3Zn_3Al_2$) during the stabilizing annealing treatment, which in the course of the paint bake cycle, further develop into precipitations that have powerful hardening effect and thus cause a particularly powerful paint bake response (PBR). At the same time, through the formation of these very phases or clusters in the size range of 1 to 10 nm, the precipitation of S phase and 13 phase is suppressed because of the comparatively high Zn content. By contrast with a sheet or strip that has not been stabilization-annealing-treated, these produced phases or clusters enable a considerable strength increase in the course of an artificial aging response, for example a paint bake response at 185° C. for 20 minutes.

In addition, due to the comparatively powerful artificial aging response, this aluminum alloy according to the invention in the T4-FH state is energy-efficient in that the available thermal energies are utilized in subsequent manufacturing steps.

The aluminum alloy according to the invention can therefore have a particularly good suitability for the manufacture of a formed part of a vehicle, preferably a body part, for example of the outer shell.

Optionally, the sheet or strip can have one or more of the following elements: from 0 to 0.8 wt % copper (Cu) and/or from 0 to 0.2 wt % silver (Ag) and/or from 0 to 1.0 wt % manganese (Mn) and/or from 0 to 0.45 wt % silicon (Si) and/or from 0 to 0.55 wt % iron (Fe) and/or from 0 to 0.35 wt % chromium (Cr) and/or from 0 to 0.2 wt % titanium (Ti) and/or from 0 to 0.8 wt % zirconium (Zr) and/or from 0 to 1.0 wt % hafnium (Hf) and/or from 0 to 0.3 wt % niobium (Nb) and/or from 0 to 0.25 wt % tantalum (Ta) and/or from 0 to 0.2 wt % vanadium (V).

The aluminum alloy contains a residue of aluminum and inevitable production-related impurities, with at most 0.05 wt % of each and at most 0.15 wt % collectively.

It should be noted in general that the term "vehicle" is understood, for example, to be a land vehicle, a water craft, and/or an aircraft.

As is known, in order to achieve the T4-FH state, in addition to a T4 treatment (=solution annealing with cold age hardening or cold tempering), the alloy is also subjected to a heat treatment, for example a thermal shock, after the solution annealing and accelerated cooling and after that, is cold age hardened.

Other examples for such a stabilizing annealing treatment are known from the literature (see Friedrich Ostermann: Aluminum Application Technology [*Anwendungstechnologie Aluminium*], 3$^{rd}$ edition, year of publication 2014, ISBN 987-3-662-43806-0, page 138) and DE112011103667T5—this stabilizing annealing treatment is also known as "pre-aging."

Aluminum Application Technology, 3$^{rd}$ edition, year of publication 2014, ISBN 987-3-662-43806-0, page 175 also discloses a solution annealing according to which during the solution annealing, the most complete possible solution of alloy elements that are involved in the hardening is achieved.

A high PBR can be enabled if the aluminum alloy has from 3.0 to 4.0 wt % Zn, more particularly from 3.3 to 3.7 wt % Zn, —more particularly because in combination with magnesium, it is possible to establish a comparatively very favorable hardening potential. In addition, in the T4-FH state, the alloy has a yield point that is relatively high in comparison to a Zn-free alloy, which is increased significantly after the subsequent forming and paint baking.

The above-described effect can be further improved if the aluminum alloy has from 4.5 to 5.0 wt % Mg. In combination with Zn, this can lead on the one hand to an advantageous hardening potential, namely a PBR, and on the other hand to a very good formability due to the Mg that is forcibly dissolved in the aluminum solid solution.

This is particularly the case if the aluminum alloy has from 0.3 to 0.6 wt %, more particularly 0.4 to 0.6 wt %, for example 0.5 to 0.6 wt %, Cu.

In this way, it is possible, for example, to achieve an increase in the precipitation density in the course of the stabilizing annealing treatment and to enable a further increase in the PBR.

Preferably, with a Cu content of >0.5 wt %, the Zn content satisfies the following condition: Zn=7.2-3.4*Cu [wt %].

Preferably, the aluminum alloy can have from 0.1 to 0.3 wt % silver (Ag). This proposed Ag content—in a way that is similar to Cu—leads to an additionally higher precipitation density in the course of the stabilizing annealing treatment—and enables a further increase in the PBR.

Preferably, the aluminum alloy can have from 0.05 to 0.25 wt % iron (Fe) in order to permit an increased percentage of secondary aluminum in the alloy.

Preferably, the aluminum alloy can have from 0.3 to 1.0 wt % manganese (Mn). Preferably, the aluminum alloy has from 0.3 to 0.5 wt % manganese (Mn). With the proposed Mn content, it is possible among other things to change the morphology of ferrous phases, as a result of which they have less of a ductility-reducing effect. In addition, increased Mn contents permit the establishment of smaller grain sizes, which can be beneficial for the formability. Furthermore, the Mn content can contribute to the establishment of suitable primary phases in order to suppress formation of Lüders bands.

Preferably, the aluminum alloy can have from 0.05 to 0.15 wt % titanium (Ti), for example in order to establish the grain size in a controlled way.

A sheet or strip according to the invention with a thickness of from 0.5 to 4 mm, more particularly from 0.8 to 2.5 mm, can especially also be suitable for the production of formed parts of a vehicle such as a motor vehicle.

Preferably, the aluminum alloy of the sheet or strip has a density of Guinier-Preston I zones (GPI zones) of at least $0.25 \times 10^{23}$ GPI zones/$m^3$ with at least 700 atoms per GPI zone, measured using the Felfer evaluation method (see P. Felfer, et al., Detecting and extracting clusters in atom probe data: a simple, automated method using Voronoi cells, Ultramicroscopy 150 (2015) 30-36) on the data ascertained by means of atom probe tomography (LEAP 3000HR-type atom probe) with Zn as the core atom for Guinier-Preston I zones (GPI zones) in Cu-free Al alloys and Zn+Cu as core atoms for Cu-containing Al alloys.

It is thus possible to insure that growable or developable T-phase precursors ($Mg_{32}(Al,Zn)_{49}$ and/or $Mg_3Zn_3Al_2$) are present in sufficient density and magnitude to insure or improve the $R_{p0.2}$ strength gain in the course of the paint bake cycle. This is more particularly the case if the aluminum alloy of the sheet or strip has a density of Guinier-Preston I zones (GPI zones) of at least $1.5 \times 10^{23}$ GPI zones/$m^3$ with at least 700 atoms per GPI zone.

It can also be sufficient if the aluminum alloy of the sheet or strip has a density of Guinier-Preston I zones (GPI zones) of at most $5.0 \times 10^{23}$ GPI zones/$m^3$ with at least 700 atoms per GPI zone.

More particularly, the sheet or strip according to the invention can be suitable for a vehicle part, preferably a body part.

A sheet or strip that enables the production of formed parts with a complex geometry and high yield strength $R_{p0.2}$ can be produced by performing the following method steps:

hot rolling of a rolling slab into a hot-rolled sheet or strip;
cold-rolling of the hot-rolled sheet or strip to a final thickness, optionally with an intermediate annealing of the sheet or strip,
heat treatment of the sheet or strip that has been cold-rolled to its final thickness, wherein the heat treatment includes:
  solution annealing with subsequent accelerated cooling,
  stabilizing annealing treatment of the sheet or strip that has undergone accelerated cooling, and
  cold age hardening of the sheet or strip that has undergone stabilizing annealing treatment.

According to the invention, the stabilizing annealing treatment of the alloy according to the invention can insure its rapid hardening kinetics, induced by the formation of stable nuclei, which are responsible for the powerful artificial aging response and more particularly, the paint bake response.

Preferably, the stabilizing annealing treatment is performed at 95° C. (degrees Celsius) to 125° C. for at least 20 min (minutes) and at most 10 h (hours) in order, by means of this temperature control, to reproducibly prepare the sheet or strip for a comparatively powerful artificial aging response and more particularly, paint bake response (PBR). This artificial aging response, for example PBR, can be further increased if the stabilizing annealing treatment is performed at 100° C. to 120° C. and/or for at least 2 h and at most 4 h.

Process conditions can turn out to be advantageous if the solution annealing is performed at 450° C. to 500° C., more particularly and for example at 460° C. to 490° C. A recrystallization can also occur in the course of the solution annealing.

In order to insure a comparatively high hardening potential, the accelerated cooling is performed with a cooling rate of the sheet or strip of at least 10° C./s. Preferably, the accelerated cooling is performed with a cooling rate of at least 20° C./s. More particularly, it is advantageous if the accelerated cooling of the sheet or strip is performed with a cooling rate of at least 10° C./s when the sheet or strip has a temperature of less than 300° C. during the cooling.

It should be noted in general that "accelerated cooling" is understood to be a cooling that is faster than a cooling at room temperature in static air (see Friedrich Ostermann, Aluminum Application Technology, $3^{rd}$ edition, year of publication 2014: Cooling after the solution annealing).

Preferably, the hot rolling is performed at a temperature of the sheet or strip of from 310° C. to at most 440° C. in order, for example, to reliably avoid edge cracking and crocodiling during the hot rolling. The method according to the invention can therefore be particularly reliable.

The advantages according to the invention with regard to high deformability for a complex geometry and high yield strength $R_{p0.2}$ can turn out to be particularly advantageous if the present aluminum sheet or strip is used for forming, more particularly cold forming, more particularly sheet metal forming, and then hot tempering, more particularly baking, preferably paint baking, to produce a formed part, more particularly a vehicle part, preferably a body part, for example of the outer shell, in a vehicle.

Advantageous process conditions can be achieved if the paint baking is performed at 150° C. to 200° C. for at least 10 and at most 30 minutes, more particularly at 170° C. to 190° C. for at least 15 and at most 25 minutes.

To verify the achieved effects, for example rolled semi-finished products, namely thin sheets (which can also be wound into a coil), were produced from various aluminum alloys—namely by means of the following method:

a. hot rolling of the rolling slab into a hot-rolled sheet or strip at 370° C. to 430° C.

b. cold-rolling of the hot-rolled sheet or strip to a final thickness of 1.2 millimeter (mm) with an intermediate annealing at 370° C. for 1 h with subsequent cooling at room temperature c. heat treatment of the sheet or strip that has been cold-rolled to its final thickness, in the above-mentioned sequence, comprising:
  i. solution annealing at 465° C.
  ii. subsequent accelerated cooling (namely water-aided quenching) at a minimum of 15° C./s
  iii. stabilizing annealing treatment of the sheet or strip that has undergone accelerated cooling at 100° C. for 3 h
  iv. cold age hardening of the sheet or strip that has undergone stabilizing annealing treatment for 3 weeks at room temperature (20° C.)

After the cold age hardening in the T4-FH state, these sheets are each formed into a formed part, namely a body part of the outer shell, by means of cold sheet metal forming with a deformation ratio of 2%. After the forming, these formed parts were subjected to a cathodic dip painting (CDP) with a paint bake cycle that has a paint bake temperature of 185° C. for 20 minutes (min).

TABLE 1

Overview of the tested alloys in wt %.

| Alloy | Mg | Mn | Zn | Cu | Si | Fe | Ag |
|---|---|---|---|---|---|---|---|
| 1 | 4.7 | 0.4 | — | — | 0.1 | 0.2 | — |
| 2 | 4.7 | 0.4 | 3.6 | — | 0.1 | 0.2 | — |
| 3 | 4.7 | 0.4 | 3.6 | 0.6 | 0.1 | 0.2 | — |
| 4 | 4.7 | 0.4 | 3.6 | 0.6 | 0.1 | 0.2 | 0.15 |

Alloy 1 is a known AA5182 alloy used as a reference alloy. Alloys 2 to 4 are alloys according to the invention and contain balanced contents of Zn, Zn+Cu, and Zn+Cu+Ag, respectively.

All of the alloys have a residue of aluminum and inevitable production-related impurities, with at most 0.05 wt % of each and at most 0.15 wt % collectively. Alloys 1 to 4 can also optionally contain 0.1 wt % chromium (Cr).

The alloys indicated in Table 1 were analyzed with regard to their mechanical characteristic values $R_{p0.2}$ and elongation at break A by means of tensile testing. The tests were performed in the T4-FH state and after the paint bake cycle (PB) with a prior deformation of 2%. In addition, the density of Guinier-Preston I zones (GPI zones) with at least 700 atoms per GPI zone was measured, namely by using the Felfer evaluation method by means of atom probe tomography (LEAP 3000HR-type atom probe) as has already been described above.

TABLE 2

Characteristic values of the tested alloys.

| | T4-FH | | | PB | | |
|---|---|---|---|---|---|---|
| Alloy | $R_{p0.2}$ [MPa] | A [%] | GPI zone density* [GPI zones/m$^3$] | $R_{p0.2}$ [MPa] | A [%] | PBR $\Delta R_{p0.2}$ [MPa] |
| 1 | 161 | 21.8 | — | 186 | 17.9 | 25 |
| 2 | 157 | 22.7 | $0.3 \times 10^{23}$ | 335 | 10.4 | 178 |
| 3 | 226 | 21.6 | $1.6 \times 10^{23}$ | 410 | 11.7 | 184 |
| 4 | 254 | 21.4 | $2.0 \times 10^{23}$ | 449 | 11.2 | 195 |

As is clear from Table 2, in comparison to alloy 1, the aluminum alloys 2 to 4 according to the invention achieve an unexpectedly powerful paint bake response (PBR) of up to 195 MPa without significantly impairing the formability (or strain) in the T4-FH state. For this reason, the alloys according to the invention in combination with the production process according to the invention have a particularly good suitability for formed parts of a vehicle body.

From the tensile test, FIG. 1 shows that the deformability of alloy 4 according to the invention in the T4-FH state, shown as L4(T4-FH) in FIG. 1, compared to alloy 1 (AA5182) in the T4-FH state, shown as L1(T4-FH) in FIG. 1, is virtually the same, with an increased strength $R_{p0.2}$.

Even more surprising is the fact that after the paint baking, the alloy 4, shown as L4(PB) in FIG. 1, has an increase in strength $R_{p0.2}$ that has been elevated so much in comparison to alloy 1, shown as L1(PB) in FIG. 1.

These properties described in relation to alloy 4 also apply to the other alloys 2 and 3 according to the invention.

In addition, the alloys according to the invention exhibit a delayed onset of the PLC effect and thus a reduction of type B flow lines.

It is also clear from Table 2 that the alloys 2 to 4 in the T4-FH state have an increasing density of Guinier-Preston I zones (GPI zones) with at least 700 atoms per GPI zone; this density of Guinier-Preston I zones (GPI zones) with at least 700 atoms per GPI zone is identified as GPI zone density* in Table 2.

Even a GPI zone density* of $1.6 \times 10^{23}$ GPI zones/m$^3$ exhibited a surprisingly high $R_{p0.2}$ strength gain after the PB to over 400 MPa, as can be seen in alloy 3, which turns out to be even higher in alloy 4.

In all of the alloys 2 to 4, a maximum density of Guinier-Preston I zones (GPI zones) of $5 \times 10^{23}$ GPI zones/m$^3$ with at least 700 atoms per GPI zone can be sufficient.

The invention claimed is:

1. A sheet or strip made of a hardenable aluminum alloy comprising:
from 4.0 to 5.5 wt % magnesium (Mg) and
from 2.5 to 5.5 wt % zinc (Zn), wherein the wt % of magnesium (Mg) is greater than the wt % of zinc (Zn), and the aluminum alloy optionally further comprises one or more of the group consisting of:

| | |
|---|---|
| up to 0.8 | wt % copper (Cu), |
| up to 0.2 | wt % silver (Ag), |
| up to 1.0 | wt % manganese (Mn), |
| up to 0.45 | wt % silicon (Si), |
| up to 0.55 | wt % iron (Fe), |
| up to 0.35 | wt % chromium (Cr), |
| up to 0.2 | wt % titanium (Ti), |
| up to 0.8 | wt % zirconium (Zr), |
| up to 1.0 | wt % hafnium (Hf), |
| up to 0.3 | wt % niobium (Nb), |
| up to 0.25 | wt % tantalum (Ta), and |
| up to 0.2 | wt % vanadium (V), | and the aluminum alloy further comprises a residue of aluminum and inevitable production-related impurities, with at most 0.05 wt % of each impurity and at most 0.15 wt % collectively, wherein the sheet or strip is in a T4-FH state, the T4-FH state being a temper condition defined as a pre-aged T4-derived temper in which, in addition to quenching and natural aging, a stabilization annealing treatment is carried out between the quenching and natural aging, the stabilization annealing being performed at 95° C. to 125° C. for at least 20 min and at most 10 h, and wherein the aluminum alloy has a density of Guinier-Preston I zones (GPI zones) of at least $0.25 \times 10^{23}$ GPI zones/m$^3$ with at least 700 atoms per GPI zone.

2. The sheet or strip according to claim 1, wherein the aluminum alloy has from 3.0 to 4.0 wt % Zn.

3. The sheet or strip according to claim 2, wherein the aluminum alloy has from 3.3 to 3.7 wt % Zn.

4. The sheet or strip according to claim 1, wherein the aluminum alloy has from 4.5 to 5.0 wt % Mg.

5. The sheet or strip according to claim 1, wherein the aluminum alloy has from 0.3 to 0.6 wt % Cu.

6. The sheet or strip according to claim 5, wherein the aluminum alloy has from 0.4 to 0.6 wt % Cu.

7. The sheet or strip according to claim 1, wherein the aluminum alloy has

| | |
|---|---|
| from 0.05 to 0.25 | wt % iron (Fe) and/or |
| from 0.3 to 1.0 | wt % manganese (Mn) and/or |
| from 0.05 to 0.15 | wt % titanium (Ti). |

8. The sheet or strip according to claim 1, wherein the aluminum alloy has from 0.1 to 0.3 wt % silver (Ag).

9. The sheet or strip according to claim 1 with a thickness of from 0.5 to 4 mm.

10. The sheet or strip according to claim 1, wherein the aluminum alloy has a density of Guinier-Preston I zones (GPI zones) of at most $5.0 \times 10^{23}$ GPI zones/m$^3$ with at least 700 atoms per GPI zone.

11. A vehicle part made of the sheet or strip according to claim 1.

12. A method for producing the sheet or strip according to claim 1, comprising the following method steps:
   hot rolling a rolling slab into a hot-rolled sheet or strip;
   cold-rolling the hot-rolled sheet or strip to a final thickness, optionally with an intermediate annealing of the sheet or strip;
   heat treatment of the sheet or strip that has been cold-rolled to its final thickness, wherein the heat treatment includes:
      solution annealing with subsequent accelerated cooling;
      stabilizing annealing treatment of the sheet or strip that has undergone accelerated cooling; and
      cold age hardening of the sheet or strip that has undergone stabilizing annealing treatment.

13. The method according to claim 12, wherein the stabilizing annealing treatment is performed at 100° C. to 120° C. for at least 2 hours and at most 4 hours.

14. The method according to claim 12, wherein the solution annealing is performed at 450° C. to 500° C.

15. The method according to claim 12, wherein the accelerated cooling, starting from a temperature of the sheet or strip of less than 300° C., is performed with a cooling rate of the sheet or strip of at least 10° C./s.

16. The method according to claim 12, wherein the hot rolling is performed at a temperature of the sheet or strip of 310° C. to at most 440° C.

17. A method of using the sheet or strip according to claim 1, comprising forming the sheet or strip into a formed part and then hot tempering to produce a formed part of a vehicle.

18. The method according to claim 17, wherein the hot tempering comprises paint baking and the paint baking is performed at 150° C. to 200° C. for at least 10 and at most 30 minutes.

* * * * *

UNITED STATES PATENT AND TRADEMARK OFFICE
CERTIFICATE OF CORRECTION

PATENT NO. : 12,480,186 B2  
APPLICATION NO. : 17/791147  
DATED : November 25, 2025  
INVENTOR(S) : Tosone et al.

Page 1 of 1

It is certified that error appears in the above-identified patent and that said Letters Patent is hereby corrected as shown below:

In the Specification

Column 2, Line 12: please delete "13" and insert -- ß --.

Signed and Sealed this  
Third Day of February, 2026

John A. Squires  
*Director of the United States Patent and Trademark Office*